United States Patent [19]

Lane et al.

[11] Patent Number: 4,951,190

[45] Date of Patent: Aug. 21, 1990

[54] MULTILEVEL MENU AND HIERARCHY FOR SELECTING ITEMS AND PERFORMING TASKS THEREON IN A COMPUTER SYSTEM

[75] Inventors: Leslie A. Lane, Santa Clara; Lynn V. Lybeck, Moss Beach; David S. Perloff, Sunnyvale; Chester L. Mallory, Santa Clara, all of Calif.

[73] Assignee: Prometrix Corporation, Santa Clara, Calif.

[21] Appl. No.: 375,878

[22] Filed: Jul. 6, 1989

Related U.S. Application Data

[63] Continuation-in-part of Ser. No. 50,925, May 15, 1987, Pat. No. 4,873,623, which is a continuation-in-part of Ser. No. 864,024, May 16, 1986, Pat. No. 4,805,089, which is a continuation-in-part of Ser. No. 729,153, Apr. 30, 1985, Pat. No. 4,679,137.

[51] Int. Cl.⁵ .......................................... G06F 15/46
[52] U.S. Cl. .................................. 364/188; 364/200; 364/221.9; 364/237.5; 364/286.2
[58] Field of Search ................ 364/146, 188, 191–193, 364/171, 200 MS File, 900 MS File; 340/706–712, 718

[56] References Cited

U.S. PATENT DOCUMENTS

| | | | |
|---|---|---|---|
| 4,001,807 | 1/1977 | Dallimonti | 364/711 X |
| 4,303,973 | 12/1981 | Williamson, Jr. et al. | 340/706 X |
| 4,396,977 | 8/1983 | Slater et al. | 364/188 |
| 4,479,197 | 10/1984 | Haag et al. | 340/712 X |
| 4,570,217 | 2/1986 | Allen et al. | 364/188 |
| 4,586,035 | 4/1986 | Baker et al. | 340/712 |
| 4,674,041 | 6/1987 | Lemon et al. | 364/401 |
| 4,679,137 | 7/1987 | Lane et al. | 364/188 |
| 4,805,089 | 2/1989 | Lane et al. | 364/188 |
| 4,843,538 | 6/1989 | Lane et al. | 364/188 |
| 4,873,623 | 10/1989 | Lane et al. | 364/188 |

Primary Examiner—Clark A. Jablon
Attorney, Agent, or Firm—Flehr, Hohbach, Test, Albritton & Herbert

[57] ABSTRACT

A method of selecting items from a hierarchy of items and then performing a selected task on the selected set of items. An engineering set up control program includes a procedure for denoting processes, groups of processes, and subgroups of processes which are available for use by operators of the system. The processes, groups and subgroups are visually presented in a three level menu. Subgroups and groups of processes can be selected using the three level menu, and then operated on as a group.

10 Claims, 6 Drawing Sheets

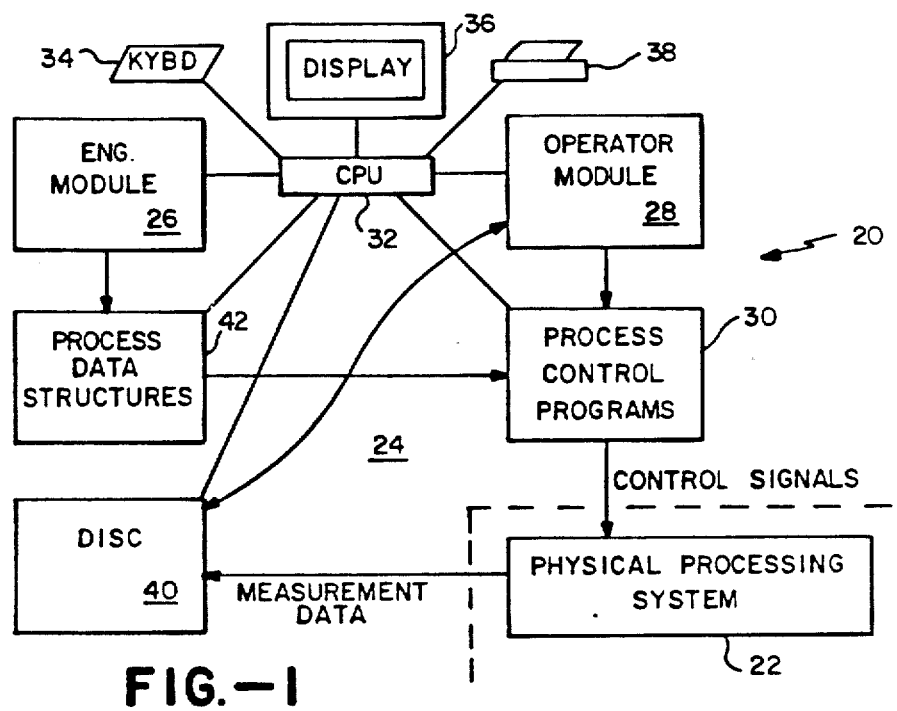
FIG.—1
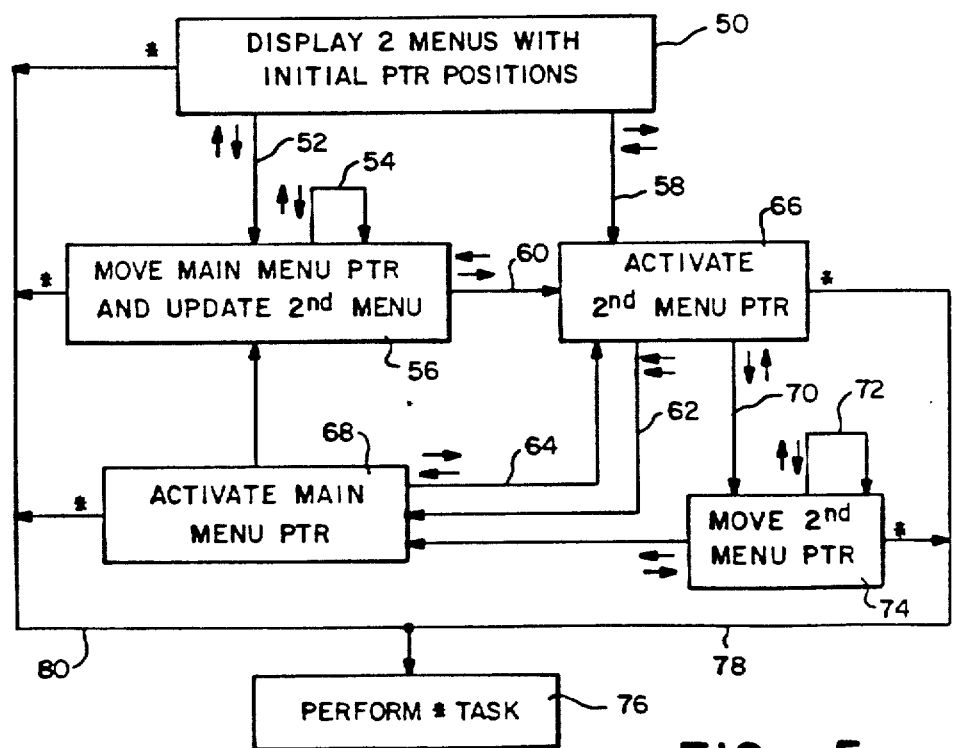
FIG.—5

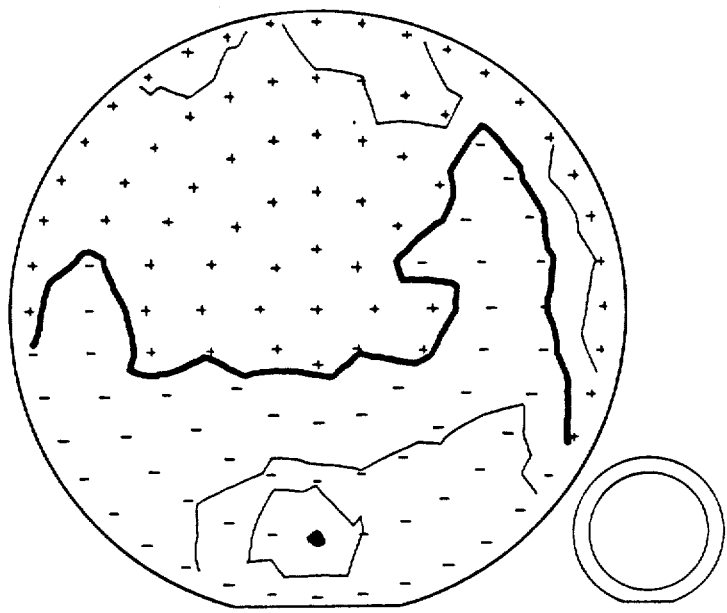
FIG.—2
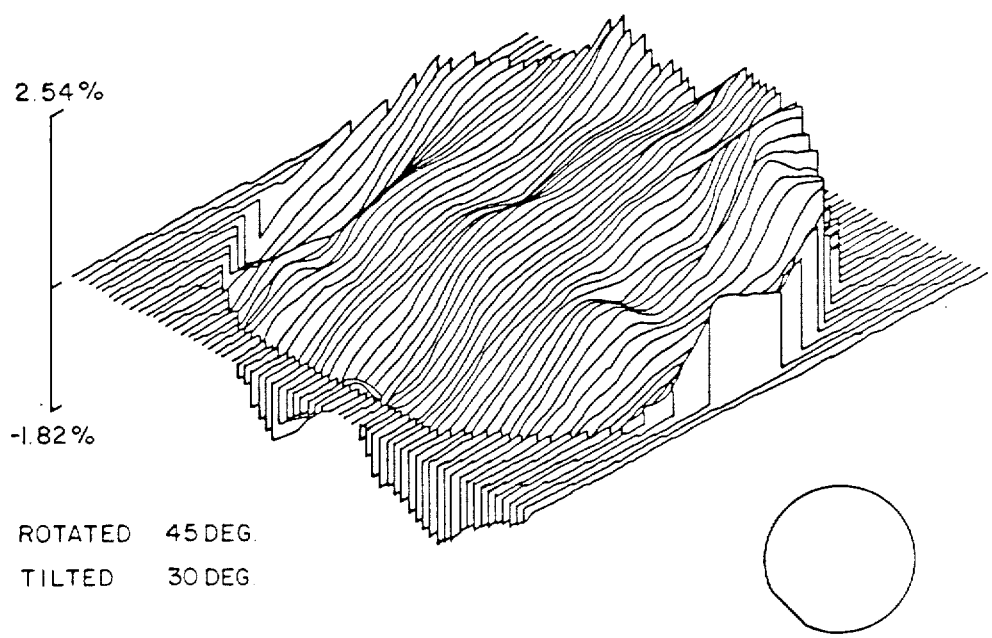
ROTATED 45 DEG.
TILTED 30 DEG.
FIG.—3

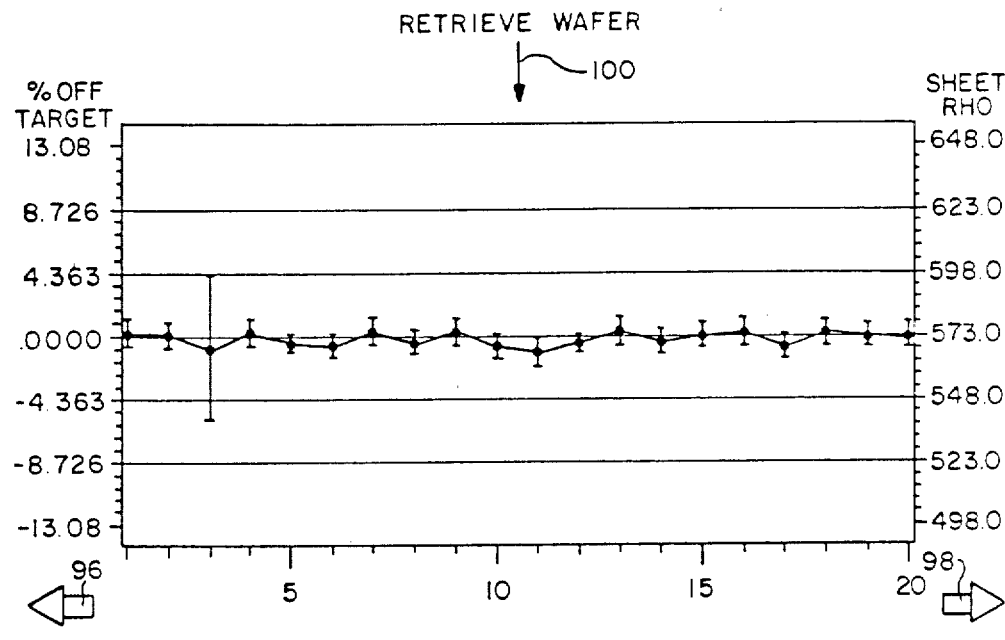
FIG. — 4

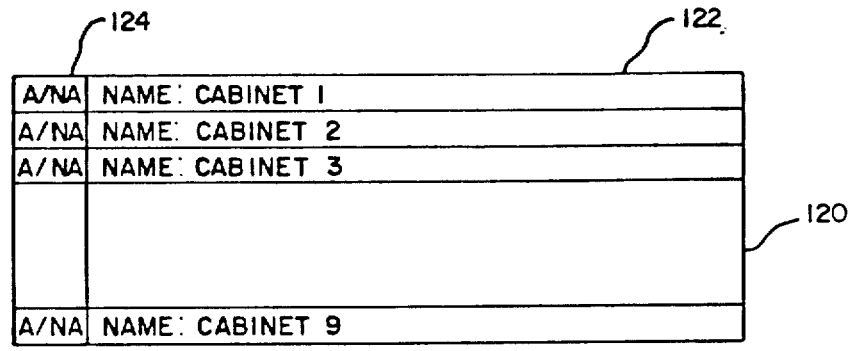
FIG.—6a
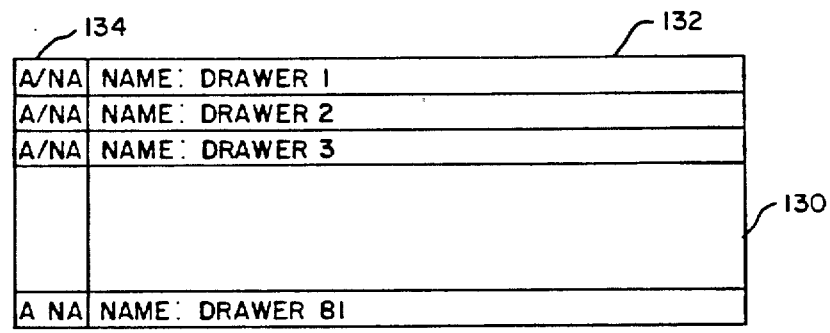
FIG.—6b
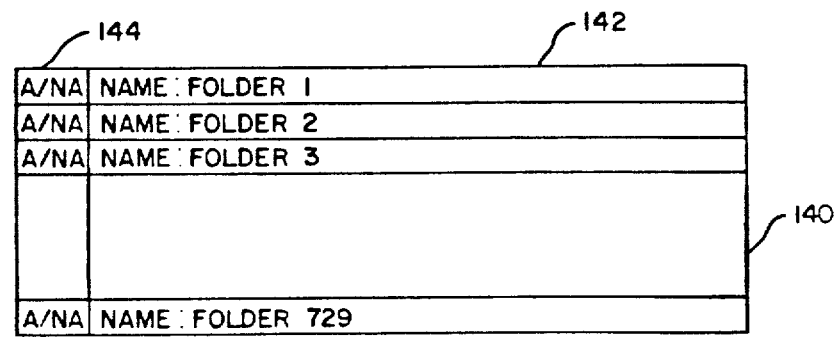
FIG.—6c

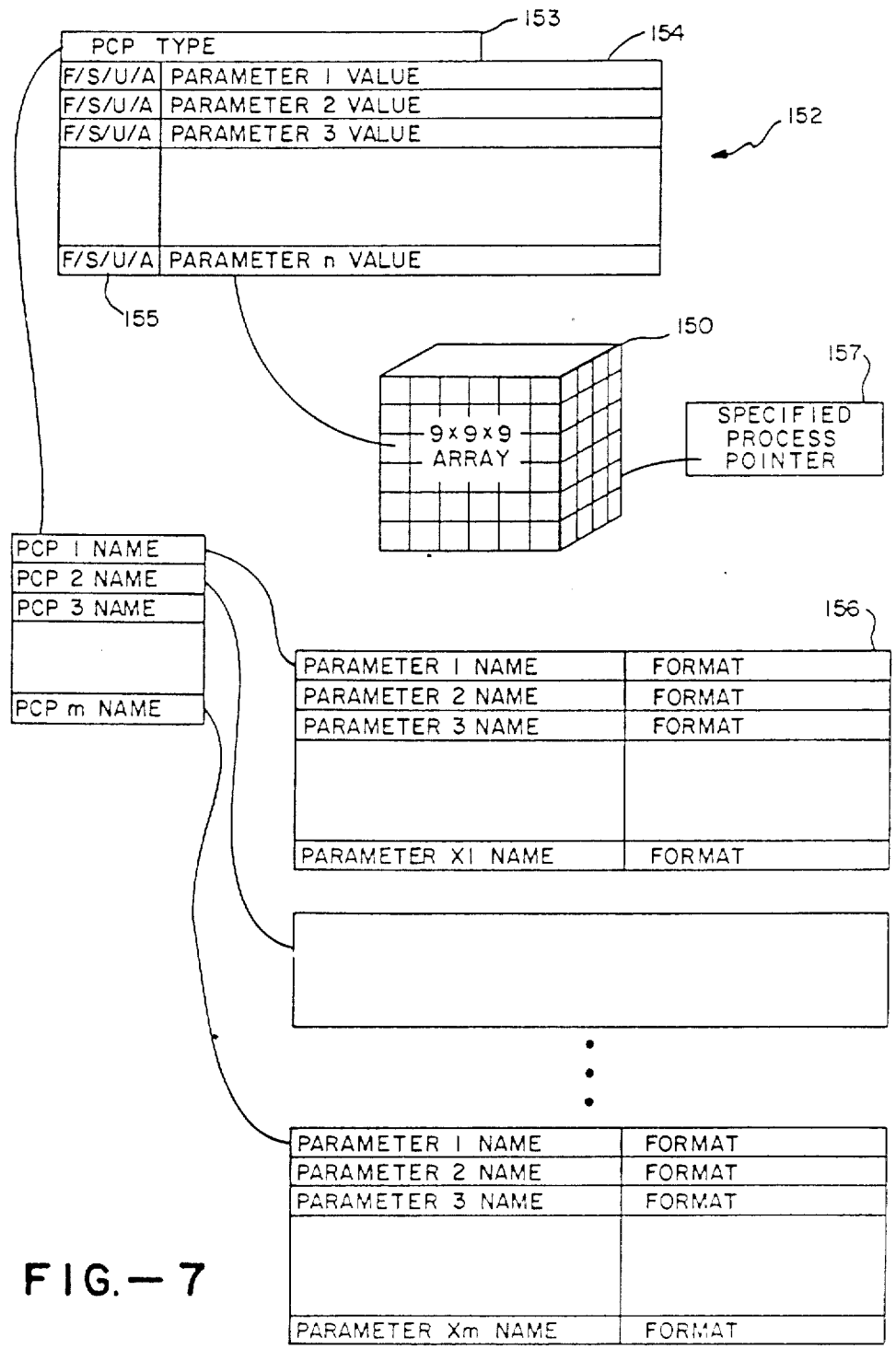
FIG.—7

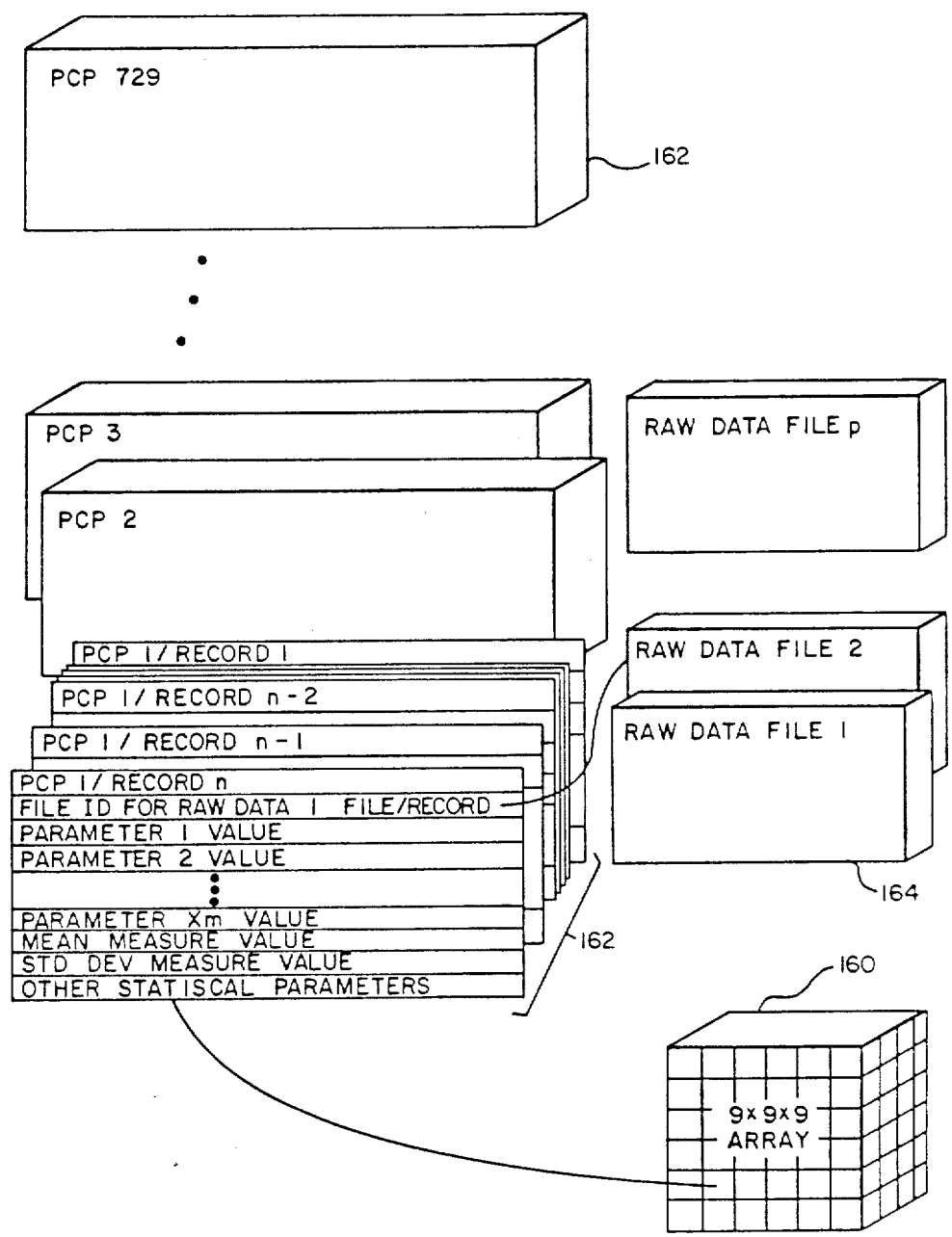
FIG. — 8

MULTILEVEL MENU AND HIERARCHY FOR SELECTING ITEMS AND PERFORMING TAKS THEREON IN A COMPUTER SYSTEM

This application is a continuation in part of application Ser. No. 07/050,925, filed May 15, 1987, now U.S. Pat. No. 4,873,623, entitled PROCESS CONTROL INTERFACE WITH SIMULTANEOUSLY DISPLAYED THREE LEVEL DYNAMIC MENU. Ser. No. 07/050,925 was a continuation in part of patent application Ser. No. 06/864,024, filed May 16, 1986, now U.S. Pat. No. 4,805,089, entitled PROCESS CONTROL INTERFACE FOR MANAGING MEASUREMENT DATA. Ser. No. 06/864,024 was a continuation-in-part of Ser. No. 06/729,153, filed Apr. 30, 1985, now U.S. Pat. No. 4,679,137, entitled PROCESS CONTROL INTERFACE SYSTEM FOR DESIGNER AND OPERATOR. Application Ser. Nos. 07/050,925, 06/864,024 and 06/729,153 are hereby incorporated herein in their entirety by reference.

This invention relates generally to systems and methods for computer control of machine processes and in particular to systems and methods for computer control which involve menu driven approaches to selection of processes including processes run by a machine and related data management processes.

BACKGROUND OF THE INVENTION

Database Management for

Industrial Process Control

While many computer controlled machines are designed to automatically record data relevant to the performance of the machine, the analysis of this data is generally not automatic. This is especially true for machines which are used to perform a variety of different processes in an industrial environment. Furthermore, the operators who run such machines are rarely assigned to data analysis and database management tasks.

This combination of circumstances tends to cause the discovery of process control problems to be delayed until there is a noticeable degradation in the quality of the product being made or in the process being performed.

The present invention provides a system and method of database management that facilitates the performance of data management and analysis tasks by operators, rather than by the engineers who have normally performed such tasks in the past. In particular, the present invention employs the same easy to use menu driven selection method for selecting a process to be run and for requesting an analysis of the data collected from previous runs of the selected process. At the push of just one or two buttons by the operator, the system of the present invention automatically sorts through the measurement data stored in the system and performs a specified data management task (such as printing a trend chart) on previously recorded data for the process specified by the operator.

As a result, the operator can initiate a data management task either just before or just after running a selected process, using the same menus as he uses for selecting and running the selected process.

Importance of Sheet Resistance

Mapping of Semiconductor Wafers

The invention described in this specification may be applied generally in computer controlled machines which perform various production or testing processes. It may also be applied to data collection and data base management programs. However, the detailed description of the invention will be given in terms of the control of an automated resistivity tester for performing sheet resistance mapping of semiconductor wafers. This equipment is used to characterize the performance of semiconductor wafer manufacturing equipment utilized to form surface layers of specific target conductivity value as part of the process of manufacturing semiconductor devices such as, for example, large scale integrated circuits.

The preferred version of an automated resistivity tester to be controlled by this invention is disclosed in co-pending and commonly assigned U.S. Patent Application Ser. No. 726,498, filed Apr. 24, 1985, now U.S. Pat. No. 4,755,746, and entitled "PROCESS CONTROL INTERFACE FOR DESIGNER AND OPERATOR." This disclosure is specifically incorporated herein by reference. The use of computer controlled testing apparatus of this type as the background environment for demonstrating the advantages of this invention is especially meaningful because of the importance of the semiconductor industry to the advancement of science and technology in many areas, including areas of factory automation to which this invention may be very meaningfully applied. To understand the overall importance of automated resistivity testing to the semiconductor industry, reference is made to the helpful background information given in the above-identified copending application on the status of the industry and the particular importance of performing automated resistivity testing on semiconductor wafers which have been subjected to ion implantation.

the correctness and uniformity of implant dosage across a semiconductor wafer can be determined in an automatic sheet resistance mapping system which has the capability of taking multiple test readings in both a contour map and diameter scan mode. From these tests and printouts, the engineer in charge of a process can determine whether the ion implantation equipment is operating properly.

In a co-pending and commonly assigned patent application entitled "Apparatus and Methods for Resistivity Testing," Ser. No. 704,296, filed Feb. 22, 1985, now U.S. Pat. No. 4,703,252, a novel arrangement for orienting the resistivity test probe for improved accuracy in performing four-point probe sheet resistance measurements on conductive surface layers of a semiconductor wafer is disclosed. The specification of that application is hereby incorporated by specific reference.

To encourage the use of testing equipment such as automated resistivity testers, it is important to provide an overall computer control program for the tester which is easy for the engineer to set up to perform in-process monitoring measurements which will provide meaningful data. It is also important for the control program to be simple for the operator to run with confidence and consistency to produce meaningful data. Engineer and operator convenience and confidence are the keys to increasing acceptance of automated process control and testing in all industries.

Prior Art Computer Control Methods

It has become a standard approach in the art to use a programmed digital computer to control the operation of various types of machinery which have the capability to perform a variety of tasks or the capability to perform the same task in a variety of ways.

Computer control of industrial machines generally involves a complex set of processes and a large number of parameters which must be entered for the machine to carry out a selected process. Because of this complexity, the set up of the machine for performing a desired process meaningfully is usually done by an engineer wh understands the overall functioning of the system and the interaction of the process parameters with the process control programs of the machine. In the better designed systems, this engineering set up is facilitated by a machine control program which provides the engineer with a sequence of different menus or prompts which direct process selection and parameter entry. These menus or prompts are typically presented individually and in sequence. In situations requiring a substantial number of menu screens, process or parameter value choices on one screen may be affected by earlier or later choices several screens away. Thus the engineering set up operation may require continuous paging back and forth between screens to check on processes selected or parameters previously entered so that overall meaningful and consistent process selection and parameter entry can be achieved at each screen level.

The complexity and inconvenience of the engineering set up protocol of most computer controlled machines tends to discourage their use except by the more sophisticated engineers at the most sophisticated companies. Even when these systems are used, the requirement to provide written operator instructions introduces a frustration that tends to discourage widespread use of the technology to achieve the benefits it could produce.

SUMMARY OF THE INVENTION

In summary, the present invention is a system and method for computer control of machine processes. A dynamic menu feature is used in the selection of processes, data management tasks, and the definition and selection of operating parameters used by a process control program to direct the performance of the process by the machine.

The system and method of this invention incorporates the feature of providing a set of predefined data management or data analysis tasks which the operator of the system can use when using the system to run a selected process. The same menus used for selecting a process to run are used for initiating data management tasks.

Measurement data structures for storing data measured during the running of processes, and related data, for a multiplicity of processes are defined and stored. Data is added to these data structures each time a process is run, and this data is automatically accessed when the operator requests data analysis on the data collected during previous uses of a selected process.

Access to measurement data for detailed data management tasks is provided not only through the dynamic menu feature, but also graphically through the use of control charts. These charts depict trends in the measurement data for selected processes. By pointing at any data point in the chart, the user can access the corresponding record of data for detailed data analysis or for use in a data management task.

BRIEF DESCRIPTION OF THE DRAWINGS

Additional objects and features of the invention will be more readily apparent from the following detailed description and appended claims when taken in conjunction with the drawings, in which:

FIG. 1 is a block diagram of a process control system in accordance with the present invention.

FIG. 2 is a flow chart of the dynamic menu aspect of the present invention.

FIG. 3 is a contour map.

FIG. 4 is a three dimensional wafer resistivity map generated by a resistivity contour map program in the preferred embodiment.

FIG. 5 is a trend plot for a single selected process which was generated by the preferred embodiment of the present invention.

FIG. 6a–c depict the process name data structures used for storing process names.

FIG. 7 depicts the parameter data structure used to define processes in the preferred embodiment.

FIG. 8 depicts the data structure used for storing measurement data and related information.

DESCRIPTION OF THE PREFERRED EMBODIMENT

Referring to FIG. 1, there is shown a block diagram of a system 20 incorporating the apparatus of this invention and capable of carrying out the method of this invention. A physical processing system 22, such as a semiconductor wafer resistivity tester, is controlled by a computer based control system 24. The control system 24, in accordance with this invention, includes an engineering set up module 26 and an operator module 28. The control system 24 further includes a set of process control programs 30, each of which is used to control the physical system 22 while it is performing a specified type of process.

The control system 24 includes a computer central process unit (CPU) 32, a keyboard 34 or equivalent device for entering commands and data into the system 24, a display device 36 such as a color monitor with a touch sensitive screen, and a printer 38. A removable 10 megabyte hard disc cartridge is used to store data structures 42 which define the process parameters used in the processes performed by the physical system 22; it is also used to store the measurement data generated by the physical system 22 during operation and measurement derived data generated by the CPU 32 such as mean values and standard deviations.

As will be explained in greater detail below (and as explained in copending application Ser. No. 06/729,153, now U.S. Pat. No. 4,679,137), the engineering module 26 is a set up control program (called the engineering set up control program) which is used by engineers to define the degree and types of restraints which limit and control the types of processes which can be run using the physical system 22. In the preferred embodiment, the computer used is a Hewlett Packard Vectra.

The engineering module furthermore includes means for storing a representation of the set of decisions made by the person using the engineering set up program on a portable magnetic disc 40. These choices are represented by entries in a set of data structures 42 which are used by both the engineering set up and process control programs.

The operator module 28 is an operator process control program used by an operator (i.e., a person) to select and run processes on the physical system 22 which have been previously set up suing the engineering set up module 26.

As will be described in greater detail below, the operator process control program 28 includes a process selection program for selecting which of the available processes is to be run on the physical system 22, a parameter entry program for specifying parametric values for use in conjunction with the process to be run by the physical system 22, and a data analysis or data management program for analyzing the measurement data collected by the control system 24 from the physical system 22.

In the preferred embodiment, the same computer can be used for engineering set up, process control, and data management. On the other hand, an engineer can use one computer to set up the processes he wants the operator to run, and can then hand the operator the disc 40 for use on a separate computer control system 24. Operators are denied access to the engineering module 26 by requiring knowledge of a password to use the engineering module 26.

In the preferred embodiment the physical system 22 is a wafer resistivity tester and there are three process control programs 30. One process control program, called Contour Map, causes the computer 36 in the operator module to send control signals to the tester 22 which direct it to measure and record the resistivity of a semiconductor wafer at a specified number of separate position coordinates on the wafer. Another process control program, called Diameter Scan, generates control command which direct the tester 22 to measure and record the resistivity of a semiconductor wafer at a specified number of separate test sites along a diameter line. A third, called Quick Check, measures the resistivity of a semiconductor at a small number of test sites to quickly determine the approximate resistivity of a semiconductor wafer.

Dynamic Menu Selection Method

The exemplary menu display shown in Table 1 is used in the preferred embodiment to select one item from a set of items. The items are organized into groups and subgroups, each of which has an assigned name. For the purposes of this example, the items are resistivity test processes which can be performed by a resistivity tester 22 under the control of a computer 24.

Three menu display regions are defined on the display screen: a group menu, a subgroup menu, and an object menu. A fourth display region at the bottom of the display is used to identify the tasks which can be performed. Some of the tasks will use the item pointed to in the third menu region.

Conceptually, it is helpful to picture the items listed in the menus as a set of folders which are organized in drawers and cabinets. In the preferred embodiment, each cabinet (i.e., each main menu item) contains up to nine drawers, and each drawer (i.e., each second menu item) contains up to nine folders. In other embodiments, the number of items under any menu could be unlimited, with the menus acting as windows which scroll up and down over the complete list of items in the menu.

There is a pointer associated with each menu region and also with the task selection region. The current position of each pointer is indicated by displaying the item in brighter video (shown in Table 1 as an asterisk "*" next to the selected menu position, except for the active pointer, as explained below) than the other items.

The subgroups shown in the second menu region are the subgroups which are associated with the group being pointed to in the first menu region. The items shown in the third menu are the items associated with the subgroup being pointed to in the second menu region.

Only one of the position pointers is active at any one time. The active pointer is shown by displaying the title of the corresponding menu in reverse video (shown in Table 1 with an asterisk "*" next to the title) and by displaying the item being pointed to by the active pointer in bright reverse video (shown in Table 1 by an arrow pointing to the item in bright reverse video).

In the preferred embodiment, the display 36 is a touch sensitive display, and the keyboard 34 contains standard up, down, left and right cursor keys.

The active pointer can be moved either by using the keyboard's cursor keys or by touching the appropriate portion of the display's screen. The active pointer can be moved from one menu to another by using either the left and right cursor movement keys on the keyboard 34, or by touching the screen in the vicinity of the menu to which the user wants to activate the pointer. Similarly, the active pointer can be moved up and down the list of items in any one menu by using the up and down cursor keys, or by touching the screen in the vicinity of the item the user wants the active pointer to point to.

When the menus are first displayed, they begin with the active pointer pointing at the first group name, and with the other pointers pointing to the first item in each menu.

As shown in Table 2, when the pointer in the cabinet menu region is moved, for instance, to point to the item labelled "EPI" in the menu, the drawer menu is automatically replaced with subgroup items associated with the group item being pointed to in the first (cabinet) menu region. Similarly, the third menu region is replaced with names associated with the new subgroup item being pointed to in the drawer menu display region.

Table 3 shows the display after the active pointer has been moved from its position in Table 2 to the second display region and has been moved down to the fifth item in the subgroup menu (labelled "REACTOR 1 - SPECIAL"). Note that the items displayed in the folder menu have been automatically updated to correspond to the item being pointed at in the drawer menu.

Referring back to Table 1, the tasks displayed along the bottom of the display are invoked by touching the appropriate box on the display screen. For example, touching the "COLLECT NEW DATA" box will cause the control system 24 to perform the resistivity measurement process corresponding to the item pointed to in the folder menu. If that process is a contour map process, the system 20 will measure the resistivity of a semiconductor wafer at a number of different points and will generate a resistivity contour map such as the maps shown in FIG. 2 and 3.

Touching the "CONTROL CHART" box in Table 1 will cause the system to generate a control or trend chart showing the mean and standard deviation of the resistivity values during a preselected number of previous runs of the process pointed to in the folder menu. An example of such a control chart is shown in FIG. 4.

Another task provided by the preferred embodiment is the selection of several processes to be used together in a data management or data analysis task. To accomplish this, the "SINGLE" box is touched. The system responds by displaying changing the text in that box to "MULTIPLE" and changing the left most box to say "SELECT", as shown in Table 4. Then, the user can select items by manipulating the menu pointers until the folder pointer points to an item to be selected, and then touching the "SELECT" box. Each selected item is displayed in reverse video (shown in Table 4 as having an asterisk to the right of the selected item). An item can be deselected by pointing the folder pointer at the selected item and then touching the "SELECT" box.

After the user has selected all the items which he wants to use, the user can then initiate one of the other tasks, such as the "CONTROL CHART" task, which causes the system to perform the selected task on all of the selected items. For instance, if the "CONTROL CHART" task is selected, then a control chart with plots for each of the selected processes will be generated.

Referring to FIG. 5, the basic menu selection method works as follows. First, at least two menu displayed with predefined initial pointer positions (box 50). For instance, in the dynamic menu example shown in Table 1 there is a first menu display region entitled CABINET and a second menu display region entitled DRAWER. Each display region has a pointer, the position of which is indicated in Table 1 by an asterisk or arrow. The items being pointed at by the display region pointers are visually distinguished (e.g., by highlighting, use of bright video or use of reverse video) from the other items in the menus so that the user will know the current position of these pointers.

Up and down cursor keys (see process flow paths 52 and 54) are used to move the main menu pointer, which automatically causes the second menu to be replaced with items corresponding to the main menu item currently being pointed at (box 56). See for example the transition from Table 1 to Table 2. Process flow path 54 represents successive movements of the main menu pointer.

Successive uses of the left and right cursor keys (process flow paths 58-64) activate the second menu pointer (box 66) and then the main menu pointer (box 68). Each such movement of the active pointer from one menu display region to another is visually confirmed by highlighting the title of the display region with the active pointer. In some, but not all, uses of the dynamic menu in the preferred embodiment the active pointer is further distinguished by showing the item being pointed at by active pointer in bright reverse video while the items being pointed at by the other display region pointers are shown in bright (but not reverse) video. The activation of the second menu pointer in Table 3 is shown by the movement of the asterisk from the title of the CABINET menu (in Table 2) to the title of the DRAWER menu (in Table 3). From the screen shown in Table 3, use of the left cursor would activate the first menu pointer and deactivate the second menu pointer.

When the second menu pointer is active, up and down cursor keys (process flow paths 70 and 72) are used to move the second menu pointer (box 74). Thus, the screen shown in Table 3 was achieved by activating the second menu pointer and then using the down cursor key four times to move the pointer down to the fifth item in the second menu display region.

At any time, a designated task can be performed (usually with reference to either the item pointed to by the active pointer or by the second menu pointer) by sending an appropriate signal to the computer (see box 76 and process flow paths 78 and 80). For instance, pressing the COLLECT NEW DATA box on the screen shown in Table 1 causes the system to use the process labelled BASE - TUBE 2 - MIDDLE to collect resistivity data from a semiconductor wafer in the resistivity tester 22.

Operator Control Program

When the system 20 is first turned on, it displays the lead-in screen shown in Table 5 below. The lead-in screen simply identifies the software program, displays a copyright notice and a warning concerning the proprietary rights in the system. The operator control program is loaded and started when the operator touches the TEST box on the command line at the bottom of the screen.

The operator assigned to carry out some resistivity testing operations on one or more wafers has, in the preferred embodiment, an operator-related disc 40 on which an engineer has caused to be stored all of the parameter data structures for a multiplicity of processes. The operator inserts this disk in the system 20, touches the TEST box on the touch screen, and the system loads the stored data structures from the disk into internal memory of the computer.

Process Selection

After the operator touches the lead in screen, the menu in Table 1 (which was described above) is displayed on the touch screen. In the preferred embodiment, processes not available for use by the operator are simply not shown in the process selection menu. The operator knows from prior instruction that the system will not allow him to select a menu item which contains no text.

The operator knows from the traveler, a process instruction sheet which accompanies the wafer(s) to be tested, which manufacturing process the wafer just underwent, which tube it was processed in, and whether the wafer was at the load end, middle or source of the tube. For this example we will assume the wafer just underwent an epitaxial deposition in the load end of Reactor 1 (i.e., a particular piece of semiconductor manufacturing equipment). As described above, the operator moves the menu pointers until the folder menu pointer points to the EPI - REACTOR 1 - SPECIAL - LOAD END folder item (in Table 3).

At this point the operator can perform any of the tasks displayed at the bottom of Table 1. We will assume that he touches the "COLLECT DATA" box. The system responds by displaying the screen shown in Table 6.

Parameter Entry

The screens in Tables 6 and 7 are for parameter entry by the operator. It includes a top prompt line which identifies the process selected by the operator (in this case, EPI - REACTOR 1 - SPECIAL - LOAD END) which will be invoked when the selected process is actually run.

Under the top prompt line is a header block which has been configured by the engineer to have a fixed heading followed by two forced entry parameters: OPERATOR and SHIFT.

The OPERATOR and SHIFT parameters are "single time forced entry parameters" that the operator must enter a value for once each time the process is selected, but need not reenter if the selected process is used multiple times. The portions of the parameter entry screen having "single time forced entry parameters" are colored yellow (designated by and "S" for "single forced" next to the area in the Table).

Parameters which require entry of a value by the operator every time the process is used, called "forced entry parameters", are highlighted with a red background (designated by an "F" for "forced" next to the area in the Table).

Parameters which are operator alterable, but not forced entry parameters, are highlighted with a blue background (designated by an "A" in the Table). Parameters with fixed values are shown in normal video with a black background (designated by a "U" for "unalterable" next to the item in the Table).

Thus the parameter entry screen is color coded to help the operator determine what information must be entered, and what information can optionally be entered, before the selected process is run.

It should be understood that OPERATOR and SHIFT are not process related parameters, but are data parameters which the engineer, in his discretion, has decided to track and thus to force the operator to enter before the process has been run. Only process control parameters are used by the process control program to determine what commands are to be sent to the tester 22. Another type of parameter, called an analysis control parameter, is used to control the analysis performed by the process control program on the data collected while the process is run.

As shown in Table 6, the labels OPERATOR and SHIFT are actually unalterable parameters designated by the engineer who set up this process, and the boxes to the right of these labels are the locations of the corresponding forced entry parameters.

The two forced entry parameters are followed by an operator alterable parameter line which the engineer has left undesignated, but may have requested the operator in written instructions to enter certain data tracking parameters under certain circumstances. The operator will type in on the keyboard, the OPERATOR and SHIFT parameters in sequence, entering each by depressing the cursor down arrow on the keyboard to reposition the pointer (shown as an arrow) to the next parameter field. The pointer will usually have an initial position at the first parameter which must be entered by the operator and this feature is part of the operator control program software.

After the operator has entered OPERATOR and SHIFT, the operator can move the cursor or pointer down to the next parameter entry area of the screen by using the cursor down key. This area displays four data parameters. Of these, only the WAFER ID parameter is a forced entry parameter which must be given a value every time the process is used; the others are operator alterable parameters for which the operator can enter a value when appropriate.

When the operator is done entering values on the screen shown in Table 6, he moves onto the next screen shown in Table 7 by touching the CONTINUE box in the command line.

At any time while using the screens shown in Tables 6 and 7, the operator can abort the parameter entry process and return to the process selection screen shown in Table 3 by touching the EXIT box in the command line.

Referring to Table 7, the operator is now asked to provide values for several process parameters (NUMBER OF SITES, WAFER DIAMETER, TEST DIAMETER, AUTO SAVE, and CURRENT) and analysis control parameters (% INTERVAL, SORT SIGMA, CAL CURVE, TARGET, CONTROL and WARNING).

The engineer has previously denoted the NUMBER OF SITES and WAFER DIAMETER parameters to be operator unalterable parameters, probably on the basis that the engineer has determined that he always wants 121 sites measured and the wafers will always be 100 millimeter wafers. The operator knows that they are fixed because they are displayed with a black background (designated in Table 6 by a "U" next to the unalterable items) and furthermore the cursor or pointer cannot be positioned on that item.

There is no need to allow the operator to alter these parameters and there is good reason not to have the operator enter these parameters at all since a mistake could be very costly in terms of improper test results which might allow wafers with improperly doped or improperly deposited epitaxial layers to undergo further processing without the problem being detected until after the circuits on the wafer were completed. In many prior art systems, the operator would have to enter these parameters from an engineer instruction sheet and an entry error could occur. Here the engineer has fixed the parameter values as the correct ones to use.

As explained above, the operator alterable parameters are designated with an "A" in Table 6 and 7, and the operator has discretion, within the instructions from the engineer, to alter these parameters in certain test situations. Another operator having a different disk with different data structures thereon may, for example, have different alterable parameters, either fewer or more.

When using the screen in Table 7, operator will find a box labelled "LOAD WAFER" once he has entered values for all of the forced entry parameters in the screens shown in Table 6 and 7. This signifies to the operator that all forced entry parameters have been entered and the system is prepared to run the selected process on the wafer.

The operator can still change any of the alterable parameters, including forced entry parameters if necessary. If the operator needs to go back to the screen shown in Table 6 to alter one or more of the values in that screen before proceeding with running the test, he can touch the PREVIOUS box in the command line to go back to the previous parameter entry screen.

Once all parameters are correct, the operator touches the LOAD WAFER box (as shown in Table 7) and the process is run by the tester under computer control without further action by the operator. The operator will be prompted by the system to load a wafer on the wafer test platform of the system. After the operator confirms that a wafer has been placed on the wafer test platform, the tester system will take over and perform the process invoked by the operator. If the invoked process is a contour map process, the system will generate a contour map such as the one shown in FIG. 2, and the measurement data will be stored on the operator's disc 40.

When the tester is finished, the wafer platform will present the wafer back to the operator, and the screen in Table 7 will reappear with the second box of the command line displaying NEXT WAFER. The operator can rerun the same test by touching NEXT WAFER, or can touch EXIT to go back to the process selection menu to select another process.

If the operator uses NEXT WAFER, the parameter entry screen in Table 6 is displayed with all the parameter entries from the previous run left unchanged — except that the forced entry parameters (denoted with an "F" in the Table) are now blank and require new values. The parameters denoted with an "S" in the Table need not be changed — entry of a value is forced only the first time the process is used. However, if the operator returns to the process selection screen (e.g., Table 4) before rerunning the process, the system will require entry of all forced (i.e., forces and single forced) parameters. After the operator has entered all the necessary parameter values in both parameter entry screens, the selected process can be rerun, as described above, by loading a new wafer onto the wafer platform and touching the LOAD WAFER box in the command line.

From this explanation, it will be appreciated that the operator control program is very easy for the operator to use with confidence. Assuming that, in configuring the various processes of the system, the engineer has employed process group titles and process names which are meaningful to the trained operator or are otherwise provided on documentation which the operator automatically has in his possession, the process selection step by the operator is greatly facilitated. Furthermore, the system automatically communicates to the operator the status of each parameter. With the already entered default values and fixed parameters, the operator has only to enter those forced entry parameters and make any changes in the operator alterable parameter values which the engineer has instructed or which the traveler accompanying the wafers to be tested signifies.

Data Management Tasks

Referring to Table 1, the operator can initiate data analysis instead of data collection simply by touching the CONTROL CHART or HISTOGRAM PLOT boxes instead of the COLLECT NEW DATA box.

When the CONTROL CHART box is used, the system 20 automatically generates a control chart like the one shown in FIG. 4. This chart 90 plots the mean measured resistivity value and a two standard deviation range of the measurements about the mean value for a preselected number of previous uses of the selected process.

The "selected process" is simply the process being pointed at in the folder menu. The number of previous uses which are included on the control chart is selected by the engineer who set up the operator's disc 40. The engineer can specify either that (1) the last X runs be plotted, or (2) the runs from the last X days be plotted, where X is a number between seven and thirty.

Viewing this control chart on the system's display 36, the operator can easily determine if the measured resistivities are close to target or are moving away from the target. This makes it easy to see trends which might be hard to detect from inspection of the raw measurement data.

To further aid the operator interpret the control chart, in one embodiment of the invention the control chart is divided into three zones: an inner zone which is highlighted with a green background; a middle zone above and below the inner zone, which has a yellow background; and an outer zone above and below the middle zone, which has a red background. The middle of the inner zone is the target resistivity value specified by the set up engineer, and the boundaries of the bands are also specified by the set up engineer so that data points in the green zone represent acceptable resistivity values, data points in the yellow zone represent wafers with questionable resistivities, and data points in the red zone represent wafers with unacceptable resistivities.

If the operator thinks that the engineer should see the control chart it can be printed by touching the PRINT box 92 on the command line 94. If the operator thinks that the data point for a particular wafer is unusual and warrants further attention, he can use the left and right arrows 96 and 98 to move the RETRIEVE WAFER pointer 100 until it points at the offending datum. The identity of the datum being pointed at by pointer 100 is displayed on prompt line 102. Touching the PLOT box 104 causes the system to generate a plot of all the measurement data for the identified wafer. The type of plot generated will depend on the type of process used to measure the data. If a contour map process was used, then a plot similar to the plots in either FIG. 2 or 3 will be generated.

Still referring to FIG. 4, the preferred embodiment's control chart includes an autoscaling feature. Normally, when setting up the process definition, the engineer specifies the scaling for the control chart. If the engineer has not specified the control chart scaling, the chart will be automatically scaled by the operator module's software; otherwise the control chart 90 generated when the operator uses the CONTROL CHART task will use the scaling specified by the engineer.

As will be understood by those skilled in the art, the engineer's preset scaling may turn out to overly compress or overly expand the control chart, rendering it useless or difficult to use. Therefore, even if the engineer has specified a control chart scale, the operator is given the ability to select autoscaling, which will automatically scale the data so that it can be usefully interpreted.

In particular, if the engineer has specified the control chart scaling, the operator can toggle between the engineer's preset scaling and the autoscaling by touching the AUTO SCALE box 112 in the command line. This box 112 will say AUTO SCALE when the engineer's preset scaling is being used, and will say PRESET SCALE when the autoscale facility is being used, thereby allowing the operator to select between the two control chart scaling modes.

In another variation of this invention, in a line just above the plot in the control chart and just below the RETRIEVE WAFER arrow 100 there is added a color coded (i.e., red, yellow, or green) line of dots, one above each data point, this helps the operator quickly determine if any of the data points require further investigation and also helps him line up the RETRIEVE wafer arrow with those data points.

If the HISTOGRAM box 106 is used then a histogram for all the data for the selected folder (identified at the top of the chart 90) will be generated using certain statistical parameters which are generated and stored each time a process is run.

Touching the DIRECTORY box 108 causes the system to display a list which identifies all the data stored from previous runs of the selected process. From this list the operator can choose one or more runs for individual plots.

The EXIT box 110 is used to get back to the screen shown in Table 1.

Multiple Process Data Analysis

Referring to Table 1, touching the SINGLE box causes the system to switch modes so as to enable data analysis on more than one folder (i.e., process) at a time. The resulting screen is shown in Table 4.

As shown in Table 4, the box on the command line which formerly read "SINGLE" now reads "MULTIPLE". This is displayed in reverse video (not shown in Table 4) so as to warn the operator that the system is in multiple plot mode. The system can be returned to its normal operating mode by touching the MULTIPLE box, which returns the system to the display shown in Table 1. Note that command line in Table 4 contains only data management tasks, the MULTIPLE box, and EXIT for exiting back to the lead-in screen.

To select each of the multiple folders (i.e., processes) for data analysis, the operator simply moves the menu pointers until the folder pointer points at the process to be selected, and then touches the SELECT box. Selected processes are displayed in reverse video — shown with an asterisk to the right of the item in Table 4. A selected process can be deselected by touching the SELECT box a second time while the folder pointer points at the selected process. While Table 4 shows three folders selected from a single drawer (subgroup), any combination of processes can be selected from the different cabinet and drawer menus for use in the multiple process data analysis.

After all the processes have been selected, the operator initiates the generation of a control chart or histogram by touching the corresponding box in the command line. The control chart will simply be a single chart containing plots similar to the one shown in FIG. 4 for each of the selected processes.

The histogram plot for multiple processes simply combines the data for all of the selected processes. This may be useful where a combined statistical analysis of several processes is more meaningful than the statistical analysis of any single folder.

Miscellaneous Operator Tasks

Referring to Table 1, the MESSAGE box on the command line is used by the operator to retrieve messages left by the engineer. More specifically, the engineer can leave messages attached to each of the processes. For example, the engineer could leave instructions on how to set up certain tests. These messages are stored on the disc 40 along with the other data structures used to control the system and to store data. Whenever the folder menu pointer points to a process with a message, the MESSAGE box is displayed in reverse video so that the operator knows there is a message for him to read. Touching the MESSAGE box causes the message to be displayed.

Touching the DIRECTORY LISTING box causes the system to display a list of all the data stored from previous runs of the selected process. From this list the operator can choose one or nore previous runs for individual plots (e.g., contour plots).

The EXIT box is used to get back to the lead-in screen shown in Table 5.

Data Structures

In the preferred embodiment data structures are defined and stored for 729 (i.e., $9 \times 9 \times 9$) predefined processes which are organized into nine supergroups and eighty-one groups of processes, where each such group contains nine processes. These data structures are initially defined by the engineering set up module 26 and then are stored on a disc 40 for later use. When the operator control module 28 is turned on, the parameter data structures (but not the measurement data structures) are copied into the computer's memory for use by the operator control module 28.

Process Names and Availability Flags

For each process, process group and process supergroup there is assigned a name and an availability flag. The names are simply the names that appear in the process selection menus, such as the menus shown in Table 1. The availability flag for each process and group determines whether the process or group is available for use by the operator. The engineer defining the processes to be used can use the availability flags to deny a specific operator (i.e., the users of a specific disc 40) access to the corresponding process, group or supergroup of processes. This is useful, for example, if a certain operator is authorized only to perform tests on certain types of wafers, or if a process has not yet been debugged but the engineer wants to use it on an experimental basis with only certain more highly trained personnel.

Referring to FIG. 6a, the SuperGroup Prompt data structure 120 contains a set of nine process supergroup names 122, each up to twenty characters long, and a set of nine corresponding group availability flags 124. The supergroup names 122 show up in the cabinet menu of the operator's process selection screen, as shown, for example, in Table 1 during the process selection step described above. Each supergroup availability flag is equal to 0 if the corresponding supergroup is available for use by the operator and is equal to 1 if the supergroup is not available.

Referring to FIG. 6b, the Group Prompt data structure 130 contains a set of eighty-one process supergroup names 132, each up to twenty characters long, and a set of eighty-one corresponding group availability flags 134. The first nine group names belong to the first supergroup, the next nine group names belong to the second supergroup, and so on. The group names 132 show up in the drawer menu of the operator's process selection screen, as shown, for example, in Table 1 during the process selection step described above. Each group availability flag is equal to 0 if the corresponding group is available for use by the operator and is equal to 1 if the group is not available.

Referring to FIG. 6c, the Process Prompt data structure 140 contains a set of 729 process names 142 and a set of corresponding process availability flags 144. The first nine process names belong to the first group, the next nine process names belong to the second group, and so on. The process names 142 for a selected group show up in the folder menu of the operator's process selection screen, as shown, for example, in Table 1 during the process selection step described above. Each process availability flag is equal to 0 if the process is available for use by the operator and is equal to 1 if the process is not available.

Parameter Formats and Data Structures

Referring to FIG. 7, the Parameter data structure 150 is used to store the parameter values for all the predefined processes. Conceptually, the Parameter data structure 150 comprises a 9×9×9 array of process parameter data structure 152. Each process parameter data structure 152 contains an indicator 153 of the process control program a associated with the process, and the default values 154, if any, of all the variable parameters associated with the process control program. The indicator 153 of the process control program acts as an indirect pointer from the data structure 152 to the process control program associated with the process.

Further, for each parameter the process parameter data structure contains a parameter status flag 155 which is equal to 0 if the parameter's status is FORCED (i.e., a forced entry parameter which must be given a value by the operator before the process can be run), 1 if the parameter's status is MAY CHANGE (i.e., changeable by the operator) parameter, 2 if the parameter's status is LOCKED (i.e., fixed in value), and 3 if the parameter's status is SINGLE FORDED (i.e., must be given a value the first time the process is used).

Since each process control program will typically have different parameters associated with it, the engineering set up module includes for each process control program a data structure format 156 which specifies the names of the parameters associated with the process, the order of the parameters are to be stored in the process parameter data structures 152, and the format of each parameter.

Each parameter has a format because some may be stored simply as text, others may be stored as an integer or floating point number, and still others may be stored as a date or in another special data format.

In both the engineering set up process, and the operator control process there is a specified process pointer 157 which is used to point to the parameter and process name data structures of a specified process. This specified process is the process which is currently selected (i.e., specified) for being set up by the engineering set up process or for running by the operator control process.

Measurement Data Structures

Referring to FIG. 8, the Measurement data structure 160 is used to store the measurement values generated by each of the predefined processes. Conceptually, the Measurement data structure 160 comprises a 9×9×9 array of measurement data structures. Actually, for each process there is one measurement files 162 and also a set of raw data records in another file 164. Both files contain one record for each data collection run performed using the corresponding process. Also, the records in the file 162 are kept in reverse chronological order, i.e., the most recent test results are stored in the first record, and the oldest measurements are stored in the last record of the files.

The records of the first file 162 contain the parameters used to set up and run the process (i.e., the parameter values entered by the operator and the engineer who set up the process), and data derived from the raw measurement value in file 162 including the mean resistivity value, the standard deviation of the measured values, and several other statistical parameters. Since each file 162 is associated with a particular process, the number of parameters for the process is known, and the system can directly access the statistical information at the end of each record (e.g., for generating control charts and histograms) simply by indexing into each record to the appropriate depth.

The storage of the process definition parameters in the measurement data file 162 provides automatic documentation of the data, and allows detailed data analysis by the engineer using a data base management program.

Each record in file 162 also contains a filed identifier which specifies the file and record in which the raw measurement data for the run is stored.

In the preferred embodiment, there is a separate raw measurement file 164 for each raw data record length. Thus the raw data for all processes which generate 121 data points (i.e., measure the resistivity of the wafer at 121 sites) are stored in one file 164, the raw data for all those which generate 225 points are stored in a second file 164, and so on. This scheme is used because it allows the use of fixed length record files, which provide fast access and are easier to set up than variable length record files.

Engineering Set Up Control Program

The operation of the engineering set up control program to produce the configuration of the system discussed above will now be explained. When the engineer starts the system, he is presented with the same initial lead-in screen (shown in Table 5) as the operator. Access to the engineering set up control program is obtained by touching the SETUP box on the command line and then entering a predefined password. At this point the parameter data structures stored on the disc 40 are loaded into the system memory. The next screen presented on the touch screen is shown in Table 8 and is called the MAIN MENU screen.

In accordance with the general use of color backgrounds to aid use of the system 20, in the preferred embodiment the displays used in the engineering module have a yellow background, while the displays for the operator module have a green background. This helps the engineer setting up the system to know which module 26 or 28 he is currently using.

Task Selection

The MAIN MENU uses the dynamic menu feature of this invention as described above. This screen has two menu display regions in the central area of the display where main menu items and subsidiary menu items are displayed using the dynamic menu display feature of this invention. The subsidiary menu items shown in the right hand region correspond to engineering set up tasks which are part of the group of tasks designated TEST DEVELOPMENT since that is the main menu item being pointed to at this time.

The DATA MANAGEMENT group of tasks is simply a more comprehensive set of data analysis, data editing and data manipulation routines than described above for the operator module.

The SYSTEM GENERATION group of tasks are used for defining the password that allows access to the engineering setup module, the system date and time, a system identifier, and several other similar functions.

The TEST DEFINITION group of engineering tasks is the most important one and will be described in detail. To initiate the performance of this group of tasks, the engineer touches the SELECT command box since the TEST SETUP task is generally performed first. The system responds by presenting the screen shown in Table 9, but with blank areas (or initial suggestive examples) in the three central menu display regions to be filled in by the engineer. The CABINET, DRAWER, and FOLDER areas are designated for supergroup, group and process names or titles, respectively.

Defining the Operator Prompts

Using the dynamic menu feature described above, the engineer moves the active pointer to any item in the menus which he wants to change. These items are changed as follows. New names are entered simply by pointing to the item and typing in a new name on the keyboard, followed by a carriage return to mark the end of the new name. The ACTIVATE box is used to toggle the item's status from available to not available and back. Not available items are displayed in reverse video (not shown in Table 9). When the operator uses the disc which the engineer has set up, processes and groups which are not available simply do not appear on the operator's display. Of course, if a process group is disabled, all of the individual processes in the group are automatically disabled since the operator cannot select any of the processes in that group.

All changes made by the engineer to the process name screen (Table 9) are reflected in the process name data structures 120, 130 and 140 as described above with reference to FIGS. 6a–c.

If the engineer has preplanned the names of all the groups and processes, the screen in Table 9 can be edited by entering all of the group and process names at one time. Later these can be added to, deleted or changed at will. As explained above, in the preferred embodiment the engineer can define up to 729 processes, organized into 81 groups and 9 supergroups.

The UPDATE box is used to store the revised process name data structure onto the disc 40.

Touching the EXIT box returns the engineer to the main menu screen shown in Table 8.

The SELECT box is used to initiate the process of defining or revising the process pointed to in the folder menu.

Test Definition

Once a process's or test's name has been defined, the next task is to define the process. To do this the engineer touches the SELECT box in the screen shown in Table 9.

As an initial matter, the engineering set up program asks the engineer to select the process control program (i.e., to select the type of test program) to be used by the process. In the preferred embodiment the choices are CONTOUR MAP, DIAMETER SCAN, and QUICK SCAN. The choice of the process control program determines the parameter data structure that will be associated with the process, as discussed above with respect to FIG. 7.

The next step to be performed is parameter definition. Once the process control program has been selected, the system displays the same screens (shown in Tables 6 and 7) as used by the operator for parameter entry, except that different tasks are provided in the command line.

Referring to Table 10, which parallels the operator parameter entry screen shown in Table 6, the prompt/information line at the top of the engineer's parameter definition screen indicates the particular process being set up and the name of the associated process control program so that the engineer knows what process he is working on.

The test setup screens enable two very important functions to be performed by the engineer: (1) denoting each of the parameters as having one of four types of status, namely operator unalterable (fixed value), operator alterable (common default value), forced entry (operator must enter to enable process running), and single forced entry (operator must enter first time process is used); and (2) entering fixed parameters and default values for operator alterable parameters. It should be noted that the parameter names in these screens are predefined relative to the process control program (CONTOUR MAP in this case) associated with the specific process being set up. The engineer may not alter these in this example. It should be recognized, however, that the engineering control program may be configured, if desired, to permit addition of optional data type parameters by the engineer.

To perform the test set up, the engineer positions the cursor or pointer at each item in the screen, touches CHANGE, and then either types in a value or toggles the item through preset choices for each parameter, using the up/down cursor control keys. For example, the NUMBER OF SITES parameter (see Table 7) has a fixed set of optional values which must be toggled through (e.g., by using the down cursor key, or pressing the CHANGE box, until the desired value is selected).

After the parameter value is set or entered, the OPTION box is used to toggle through the four choices of Unalterable, operator Alterable), Forced operator entry, and Single forced operator entry. These four different options are reflected on the engineers display using the same color coding as seen by the operator when entering parameter values (i.e., red for Forced entry parameters, yellow for Singe forced entry parameters, blue for operator Alterable parameters, and black for fixed value operator Unalterable parameters).

It should be noted that, whenever necessary or desirable, each of the process parameters which requires entry by the operator is subjected to a validity check, such as for example, the entry of a valid date or wafer identification. The engineer could be permitted as a supplemental test set up function to establish a particular format and/or other constraint for the parameter value or date to be entered.

All changes made by the engineer to the parameter definition screens are reflected in the parameter data structures 150 as described above with reference to FIG. 7.

After the parameters for both parameter screens (see, for example, Tables 10 and 7) have been defined, the engineer can use the UPDATE box to store the revised parameter data structures 150 on the disc 40.

Also, after both parameter screens have been defined, a third screen (not shown) is provided so the engineer can write a message for the operator to read before using the process and can define the number of wafer runs to be included in control charts generated by the operator. The engineer can specify either that (1) the last X runs be plotted, or (2) the runs from the last X days be plotted, where X is a number between seven and thirty. Note that the control chart warning zones discussed above (in the section on the operator control program) are defined in the parameter definition screen (see Table 7).

This test setup must be done for every one of the configured processes by selecting the process using the screen in Table 9 and then invoking the test definition function by using the SELECT box. While this is a time consuming task, it is one which is very easy to perform in a straightforward manner using the friendly tools which are incorporated in the engineering set up program.

Process Definition Duplication

Referring back to Table 8, the DUPLICATE set of tasks in the TEST DEVELOPMENT task group can be used by an engineer to greatly reduce the effort involved in setting up a large number of processes. When the DUPLICATE task is selected, a screen similar to the process selection screen (such as the one shown in Table 9) is provided, except that the tasks on the command line are: SELECT SOURCE, SELECT DESTINATION, COPY PROMPT, COPY PARAM, COPY P&P, and COPY DATA.

The SELECT SOURCE box is used to select a folder, drawer or cabinet that the user wants to copy. The SELECT DESTINATION box is used to select one or more items at the same menu level as the selected source item. Then, by using one of the copy boxes the corresponding data structures are copied from the selected source to the selected destination(s). Using the COPY PROMPT box causes the process name and availability data structures to be copied; the COPY PARAM box is used to copy the parameter data structure; the COPY P&P box is used to copy the parameter and the process name and availability data structures; and the COPY DATA box is used to copy the measurement data structures.

As will be appreciated by anyone who considers the matter, being able to copy the process name and parameter data structures greatly reduces the effort required to set up a large number of similar but somewhat different processes.

From the above discussion, it should be apparent that the system and method of this invention provides to the engineer all of the advantages discussed in the introductory section of this specification. Specifically, with respect to the use of the invention in connection with setup of an automated resistivity tester, it should be apparent that the engineer is provided with tools to easily and conveniently set up multiple test process configurations, each with individual parameter status denotion and availability denotion. The results of all of this setup effort are stored in associated data structures and not on a collection of documents which can get lost, garbled or misinterpreted.

Furthermore, the engineer can, at will, revise any of the configured test processes by direct revision of data structure values rather than dealing with revising process instructions on paper. If the engineer wishes to maintain records of the prior configurations, these could be stored on one of the operator-related disks, but with all process groups disabled so that the disk cannot be mistakenly used by an operator. This, in itself, eliminates the "paperwork confusion" that often surrounds process revision level documentation and the mistakes that can be made by an operator who uses an obsolete version of written process instructions. If the engineer proceeds carefully with use of the tools provided by the system and method of this invention, all of the operator-related disks will only have enabled process configurations which are current and correct.

While the system and method of this invention does not avoid the time consuming task of setting up multiple test processes, once the engineer has learned to use the tools provided by the system and method of this invention, the engineering setup tasks can be performed much more efficiently and effectively. By eliminating the drudgery of maintenance of documentation and providing the convenience and confidence engendered by use of the system and method of this invention will encourage more widespread, effective use of computer controlled testing.

Alternate Embodiments

While the present invention has been described with reference to a few specific embodiments, the description is illustrative of the invention and is not to be construed as limiting the invention. Various modification may occur to those skilled in the art without departing from the true spirit and scope of the invention as defined by the appended claims.

TABLE 1

| *CABINET | DRAWER | FOLDER |
|---|---|---|
| SUB-COLLECTOR | TUBE 1 | LOAD END |
| COLLECTOR | * TUBE 2 | * MIDDLE |
| COLLECTOR PLUG | TUBE 3 | SOURCE |
| EMITTER | TUBE 4 | |
| → BASE | | |
| HIGH VALUE RESISTOR | | |
| EPI | | |
| SPUTTERED ALUMINUM | | |
| PLATINUM SILICIDE | | |

| COLLECT NEW DATA | HISTOGRAM PLOT | CONTROL CHART | DIRECTORY LISTING | SINGLE | MESSAGES | | EXIT |

TABLE 2

| *CABINET | DRAWER | FOLDER |
|---|---|---|
| SUB-COLLECTOR | * REACTOR 1 | * POSITION 1 |
| COLLECTOR | REACTOR 2 | POSITION 2 |
| COLLECTOR PLUG | REACTOR 3 | POSITION 3 |
| EMITTER | | POSITION 4 |
| BASE | REACTOR 1 - SPECIAL | POSITION 5 |
| HIGH VALUE RESISTOR | REACTOR 2 - SPECIAL | |
| → EPI | REACTOR 3 - SPECIAL | |
| SPUTTERED ALUMINUM | | |
| PLATINUM SILICIDE | | |

TABLE 2-continued

| COLLECT NEW DATA | HISTOGRAM PLOT | CONTROL CHART | DIRECTORY LISTING | SINGLE | MESSAGES | | EXIT |
|---|---|---|---|---|---|---|---|

TABLE 3

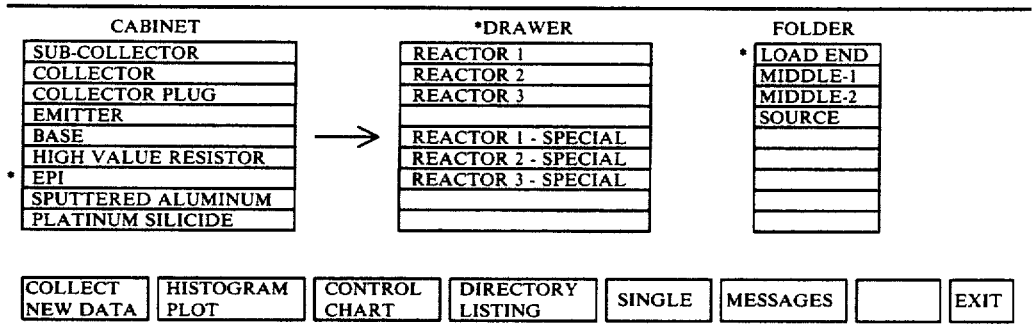

| COLLECT NEW DATA | HISTOGRAM PLOT | CONTROL CHART | DIRECTORY LISTING | SINGLE | MESSAGES | | EXIT |
|---|---|---|---|---|---|---|---|

TABLE 4

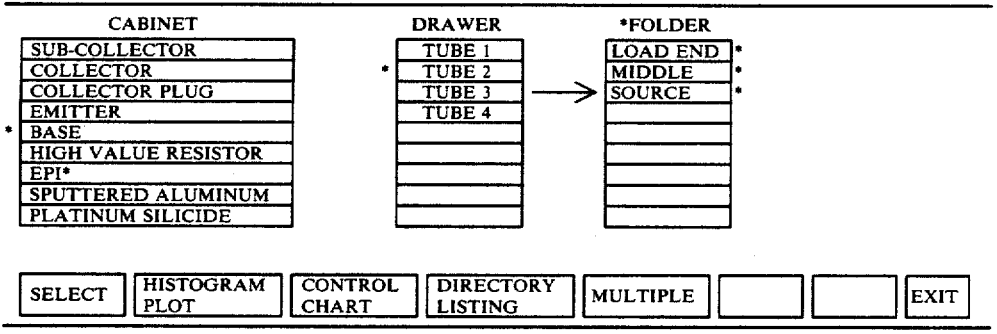

| SELECT | HISTOGRAM PLOT | CONTROL CHART | DIRECTORY LISTING | MULTIPLE | | | EXIT |
|---|---|---|---|---|---|---|---|

TABLE 5

INTRODUCTION

Prometrix OmniMap RS50

© COPYRIGHT 1986 Prometrix Corporation
VERSION 2.00

This software is an unpublished, copyrighted work and contains proprietary information of the Prometrix corporation. Use is restricted to the REGISTERED LICENSEE on DESIGNATED HARDWARE at a DESIGNATED LOCATION and is subject to the terms of the Prometrix Software License Grant. This system is serialized in the name of the REGISTERED LICENSEE and may not be resold or transferred without the consent of Prometrix Corporation.

*PATENT PENDING*

| TEST | | | | | | | SETUP |
|---|---|---|---|---|---|---|---|

TABLE 6

| EPI | REACTOR 1 - SPECIAL | LOAD END |
|---|---|---|

A [PLATINUM SILICIDE TEST CASE 42]

| | | | |
|---|---|---|---|
| U | OPERATOR | | S |
| U | SHIFT | | S |
| A | | | A |

LOT ID [07 - 7368] A  PROCESS DATE [ ] A
WAFER ID [AX-__] F  PROCESS TIME [ ] A

TABLE 6-continued

| CONTINUE | | | | | | | | EXIT |

TABLE 7

| EPI | REACTOR 1 - SPECIAL | LOAD END |

|  |  |  |  |  |  |
|---|---|---|---|---|---|
| SITES | 121 SITES | U | % INTERVAL | 1.00% | A |
| WAFER DIA. | 100 mm/3.94 in. | U | | | |
| TEST DIA. | 100 mm/3.94 in. | A | | | |
| AUTO SAVE | NO | A | | | |
| CURRENT | Aut 7.50 mV  Man | U | TARGET | 55.0 | U |
| SORT SIGMA | 3.00 | A | CONTROL | 1.00% | U |
| CAL CURVE | None | A | WARNING | 2.00% | U |

| PREVIOUS | LOAD WAFER | | | | | | EXIT |

TABLE 8

| ENGINEERING MENU |

| DATA MANAGEMENT | * TEST SETUP |
|---|---|
| → TEST DEVELOPMENT | DUPLICATE |
| SYSTEM GENERATION | PRINT |
|  |  |

| SELECT | | | | | | | EXIT |

TABLE 9

| TEST SETUP EDIT SELECTION |

| *CABINET | DRAWER | FOLDER |
|---|---|---|
| SUB-COLLECTOR | TUBE 1 | LOAD END |
| COLLECTOR | * TUBE 2 | * MIDDLE |
| COLLECTOR PLUG | TUBE 3 | SOURCE |
| EMITTER | TUBE 4 | |
| → BASE | | |
| HIGH VALUE RESISTOR | | |
| EPI | | |
| SPUTTERED ALUMINUM | | |
| PLATINUM SILICIDE | | |

| SELECT | | | ACTIVATE | UPDATE | | | EXIT |

TABLE 10

| EPI | REACTOR 1-SPECIAL | LOAD END |

A | PLATINUM SILICIDE TEST CASE 42 |

| U | OPERATOR | | S |
| U | SHIFT | | S |
| A | | | A |

| LOT ID | 07 - 7368 | A | PROCESS DATE | | A |
| WAFER ID | AX - ___ | F | PROCESS TIME | | A |

| CONTINUE | | OPTION | CHANGE | UPDATE | | | EXIT |

What is claimed is:

1. A method for performing tasks on selected sets of items in a computer system having a display device, the steps of the method comprising:

establishing at least three separate menu display regions on said computer display device, each display region capable of displaying multiple menu items and an associated selectably positionable pointer to an individual menu item;

defining a plurality of separate main menu items;

defining a plurality of separate groups of auxiliary menu items, each group being associated with at least one of said main menu items;

defining a plurality of groups of tertiary menu items, each group being associated with at least one of said auxiliary menu items;

defining and storing for each said menu item a plurality of parameter values;

displaying in a first one of said menu display regions at least a plurality of said main menu items;

displaying simultaneously in a second one of said menu display regions at least a portion of one of said groups of auxiliary menu items associated with a selected one of said main menu items being displayed in said first menu display region;

displaying simultaneously in a third one of said menu display regions at least a portion of one of said groups of tertiary menu items associated with a selected one of said auxiliary menu items being displayed in said second menu display region;

selecting one of said items displayed in said first and second display regions; and then performing a predefined task on all of the items in the group of items corresponding to said selected item.

2. A method for performing tasks as set forth in claim 1, wherein said predefined task is a group duplication task, and said performing step includes the steps of creating a new menu item of the same type as said selected item, creating a group of new menu items corresponding to said group of items for said selected item, and storing parameter values for each newly created menu item, said parameter values for each newly created menu item, said parameter values corresponding to said parameter values stored for said selected item and the group of items corresponding to said selected item.

3. A method for performing tasks as set forth in claim 1, said selecting step including the steps of selecting a first item in said first and second display regions and a second item in the same display region as said first selected item;

said predefined task comprising a duplication task, said performing step including the steps of creating a group of new menu items associated with said second selected item, said new menu items corresponding to said group of items for said first selected item, and storing parameter values for each newly created menu item, said parameter values corresponding to said parameter values stored for said group of items corresponding to said first selected item.

4. A method for performing tasks as set forth in claim 1, further including the steps of:

defining a plurality of predefined tasks operable on a selected one of said menu items;

said performing step including the step of selecting one of said predefined tasks, and then performing said selected predefined task on all of the items in the group of items corresponding to said selected item.

5. A method for performing tasks on selected sets of items in a computer system having a display device, the steps of the method comprising:

establishing at least three separate menu display regions on said computer display device, each display region capable of displaying multiple menu items;

defining a plurality of separate main menu items;

defining a plurality of separate groups of auxiliary menu items, each group being associated with at least one of said main menu items;

defining a plurality of groups of tertiary menu items, each group being associated with at least one of said auxiliary menu items;

defining, for each said menu item, a data structure for storing data, and storing data values in said data structures;

displaying in a first one of said menu display regions at least a plurality of said main menu items;

displaying simultaneously in a second one of said menu display regions at least a portion of one of said groups of auxiliary menu items associated with a selected one of said main menu items being displayed in said first menu display region;

displaying simultaneously in a third one of said menu display regions at least a portion of one of said groups of tertiary menu items associated with a selected one of said auxiliary menu items being displayed in said second menu display region;

selecting one of said items displayed in said first and second display regions; and then performing a predefined task on all of the menu items in the group of menu items corresponding to said selected item, said predefined task using said data values stored in said data structures associated with said group of menu items.

6. In a method for displaying and selecting menu items on a computer display device, the steps of:

defining a plurality of separate main menu items;

defining a plurality of separate groups of auxiliary menu items, each group being associated with at least one of said main menu items;

defining a plurality of tertiary menu items, each said tertiary menu item corresponding to at least one of said auxiliary menu items;

establishing at least three separate menu display regions on said computer display device, each being capable of displaying multiple menu items and denoting as selected one or more of said displayed menu items;

displaying in a first one of said menu display regions at least a plurality of said main menu items displaying simultaneously in a second one of said menu display regions at least a portion of one of said groups of auxiliary menu items associated with a selected one of said displayed main menu items;

displaying simultaneously in said third menu display region the tertiary menu items corresponding to a selected one of said auxiliary menu items displayed in said second menu display region;

selecting one of said main menu items displayed in said first display regions; and then performing a predefined task on all of the auxiliary menu items in the group of auxiliary menu items corresponding to said selected main menu item.

7. A method for performing tasks as set forth in claim 6, said performing step further including the step of performing said predefined task on all of the groups of tertiary menu items corresponding to said auxiliary menu items in said group of auxiliary menu items corresponding to said selected main menu item.

8. A method for performing tasks as set forth in claim 6, further including the step of defining and storing for each said menu item a plurality of parameter values;
    said selecting step including the step of selecting first and second items in said first display region;
    said predefined task comprising a duplication task, said performing step including the steps of creating a group of new auxiliary menu items associated with said second selected item, said new auxiliary menu items corresponding to said group of auxiliary items for said selected item, and storing parameter values for each newly created auxiliary menu item, said parameter values corresponding to said parameter values stored for said group of auxiliary items corresponding to said first selected item.

9. A method for performing tasks as set forth in claim 6, further including the steps of:
    defining a plurality of predefined tasks operable on a selected one of said menu items;
    said performing step including the step of selecting one of said predefined tasks, and then performing said selected predefined task on all of the auxiliary menu items in the group of auxiliary menu items corresponding to said selected item.

10. A method for performing tasks as set forth in claim 6, further including the steps of:
    defining a plurality of predefined tasks operable on a selected one of said menu items;
    said performing step including the step of selecting one of said predefined tasks, and then performing said selected predefined task on all of the auxiliary and tertiary menu items corresponding to said selected item.

* * * * *